United States Patent Office 2,723,974
Patented Nov. 15, 1955

2,723,974

PROCESS FOR PREPARING THE MONOPOTASSIUM SALT OF PYRAZINE-2,3-DICARBOXYLIC ACID

Thomas Rees and Fred Bernard Dorf, Plainfield, N. J., assignors to American Cyanamid Company, New York, N. Y., a corporation of Maine No Drawing. Application December 4, 1953,
Serial No. 396,335

7 Claims. (Cl. 260—250)

This invention relates to the monopotassium salt of pyrazine-2,3-dicarboxylic acid.

Compounds of pyrazinoic acid such as the amide are of interest as pharmaceuticals as the compound shows good tuberculostatic activity. The most economical processes for preparing pyrazinoic acid involve decarboxylation of pyrazine-2,3-dicarboxylic acid which is readily obtained by the oxidation of quinoxaline. The process, however, involves some difficulty, particularly in the recovery or isolation of the pyrazine-2,3-dicarboxylic acid. This acid is water-soluble and is not readily extracted from aqueous solutions by organic solvents. Usually an aqueous solution is evaporated to dryness to produce a crude product containing inorganic matter, and the residue is extracted with organic solvents. Another process which has been used is to isolate the silver or barium salt and regenerate the acid from the silver salt with hydrogen sulfide or hydrochloric acid or from the barium salt with sulfuric acid. Both processes are expensive and the decarboxylation of pyrazine-2,3-dicarboxylic acid is a thoroughly critical matter as the pyrazinoic acid resulting is itself sensitive and can easily be further decarboxylated to pyrazine. As a result, the decarboxylation has been effected with very mild conditions by subliming the product under diminished pressure, thus, adding still further to the cost of production.

According to the present invention, we have found that the monopotassium salt of pyrazine-2,3-dicarboxylic acid possesses extraordinarily valuable properties. In the first place, it has low solubility in water and can readily be precipitated out in the form of its hemihydrate, particularly in the presence of potassium salts which still further reduce the solubility of the monopotassium salt. Not only is it an easy matter to isolate the monopotassium salt in a very satisfactory degree of purity, but in the subsequent decarboxylation step the monopotassium salt exhibits a valuable new property. Decarboxylation to the corresponding potassium salt of pyrazinoic acid does not require any of the elaborate precautions which are needed to decarboxylate pyrazine-2,3-dicarboxylic acid. Instead of accomplishing the decarboxylation by sublimation under diminished pressure, decarboxylation can be accomplished without fear of excessive decarboxylation, since the resulting potassium salt of pyrazinoic acid shows very much greater stability toward heat and a greatly reduced tendency to decarboxylate to pyrazine. It is not known why the monopotassium salt is so much more stable in the decarboxylation reaction and it is not intended to limit the invention to any particular theoretical explanation.

The decarboxylation of the monopotassium salt is preferably accomplished by heating the monopotassium salt in a polar reaction medium such as diethylene glycol or mildly acidified water, for example. In general, any suitable ionizing solvent can be used, the only precautions being that the solvents do not cause further decarboxylation of the potassium pyrazinoate and are not reactive during the decarboxylation.

In this aspect of the present invention, the monopotassium salt is heated in the polar solvent at a temperature ranging from about 160° C. to 200° C., or as low as 125°–135° C., if desired, though the decarboxylation reaction is quite slow at this temperature, so as to form crude potassium pyrazinoate which is precipitated with alcohol or acetone, and forming pyrazinoic acid by acidification with a suitable mineral acid. The pyrazinoic acid may be further purified by recrystallization and reprecipitation from water. Yields of the order of 56% are obtainable by this process.

While in its broader aspects the present invention includes the monopotassium salt of pyrazine-2,3-dicarboxylic acid as a new chemical compound regardless of the uses to which it is put, in a more specific aspect there is included the improved decarboxylation reaction to potassium pyrazinoate described above.

The processes by which the new compounds of the present invention can be prepared are quite simple, particularly when the crude product is obtained by the oxidation of quinoxaline with potassium permanganate. Essentially, all that is necessary is to acidify to the point at which the monopotassium salt of pyrazine-2,3-dicarboxylic acid is formed followed by cooling if necessary after concentration. Purification by washing with ice water permits obtaining the monopotassium salt of pyrazine-2,3-dicarboxylic acid in a very satisfactory degree of purity. The invention is in no sense limited to producing the monopotassium salt by the above process which, however, presents some operating advantages. Quinoxaline may also be oxidized by other means but when potassium permanganate is used, the potassium salt is produced directly, and substantial savings in cost result.

The invention will be described in greater detail in conjunction with the following specific examples in which the parts are by weight unless otherwise specified.

Example 1

Sixty parts of quinoxaline are dissolved in 1190 parts of water. The mixture is heated to 90° C. with stirring and 437 parts of solid potassium permanganate added while maintaining the temperature between 88° C. and 92° C. The rapidity of the addition depends on the cooling facilities available as the reaction is exothermic, and external cooling is necessary when a rapid addition of the potassium permanganate is employed. When the oxidation is complete, the manganese dioxide formed is filtered off after the addition of filter aid. The manganese dioxide cake is then washed with 500 parts of water at 85° C., then slurried with another 500 parts of water at the same temperature, filtered and finally washed with a third 500 parts of hot water. The filtrates and washings after being combined are evaporated to 365 parts by volume and then neutralized with 12 N hydrochloric acid and cooled to 20° C. To the cool solution, further hydrochloric acid is added until the solution becomes strongly acid (blue-black to Congo red or tan to benzopurpurin). A white precipitate in the form of a slurry results which is cooled to 5° C., filtered and washed with 30 parts of ice water. The precipitate is then dried at 65° C. A good yield of monopotassium salt (hemihydrate) of pyrazine-2,3-dicarboxylic acid is obtained.

Example 2

Thirty parts of quinoxaline are dissolved in 1500 parts of water at 50° C. and 13 parts of sodium hydroxide and 20 parts of diatomaceous earth filter aid added. After thorough stirring, 218 parts of solid potassium permanganate are added, the temperature being maintained at 50–55° C. by cooling. When the addition is complete, the mixture is maintained at a temperature between 50°

C. and 80° C. until the purple color of the permanganate disappears whereupon the mixture is filtered and the manganese dioxide cake washed with 150 parts of hot water. The filtrate and wash water are combined giving a total volume of about 700 parts by volume which is then neutralized with 32 parts of 12 N hydrochloric acid and evaporated to dryness under a vacuum. The resulting residue is then dissolved in 120 parts of hot water and acidified to Congo red with 12 N hydrochloric acid. A white precipitate forms and the resulting slurry is chilled to 5° C., filtered and washed with 30 parts of ice water. The solids are then dissolved in hot water, the hot solution filtered and the filtrate chilled. White crystals precipitate, which are recovered by filtration, and upon analysis are shown to be the monopotassium salt (hemihydrate) of pyrazine-2,3-dicarboxylic acid.

*Example 3*

One hundred parts of the monopotassium salt (hemihydrate) of pyrazine-2,3-dicarboxylic acid is added to 500 parts of water, and 40 parts of concentrated hydrochloric acid is added. The solution is refluxed for 40 hours, cooled to 0° C., and filtered. The grey black precipitate is washed with 50 parts ice water and dried. The crude material is suspended in 320 parts of water and dissolved by the addition of 30 parts of concentrated ammonia. After decolorization with diatomaceous earth, the product is reprecipitated by the addition of 50 parts concentrated hydrochloric acid. The powder is reprecipitated, producing a 52.3% yield of pyrazinoic acid.

*Example 4*

Fifty parts of the monopotassium salt (hemihydrate) of pyrazine-2,3-dicarboxylic acid are added to 155 parts of diethylene glycol. The mixture is stirred and heated at 190–200° C. The mixture is then cooled. If this mixture is diluted with an equal volume of water and acidified to a pH of about 1.0, no precipitation of pyrazinoic acid occurs on chilling, although the acid is insoluble at this pH in pure water. If on the other hand, the reaction mixture is diluted by the addition of 167 parts of alcohol, crude potassium pyrazinoate precipitates. The crude potassium pyrazinoate thus isolated is washed with alcohol and dried. The solids are dissolved in 75 parts of water at 39° C. and clarified with diatomaceous earth. The clear solution is acidified with 17.5 parts of 12 N hydrochloric acid to give a precipitate of crude pyrazinoic acid, which is washed, filtered, and dried. The crude pyrazinoic acid is recrystallized from water producing a 56% yield of pyrazinoic acid, melting at 220–221° C. with decomposition.

*Example 5*

The procedure of Example 3 is followed, except that the acidified solution of the monopotassium salt is refluxed for 30 hours. A 50% yield of pyrazinoic acid is obtained.

We claim:

1. A process of preparing the monopotassium salt of pyrazine-2,3-dicarboxylic acid which comprises oxidizing quinoxaline with potassium permanganate, removing manganese dioxide produced in the oxidation, acidifying the resulting solution of the potassium salt of pyrazine-2,3-dicarboxylic acid in water whereby precipitation of the monopotassium salt of pyrazine-2,3-dicarboxylic acid commences, cooling the resulting slurry to complete essentially the precipitation, and separating the monopotassium salt from the slurry.

2. A process of producing potassium pyrazinoate which comprises heating the monopotassium salt of pyrazine-2,3-dicarboxylic acid in a mildly acid polar reaction medium at a temperature sufficiently high to effect partial decarboxylation.

3. A process of decarboxylation of the monopotassium salt of pyrazine-2,3-dicarboxylic acid which comprises heating the monopotassium salt of pyrazine-2,3-dicarboxylic acid in the presence of a polar solvent, precipitating the crude potassium pyrazinoate so formed, acidifying the potassium pyrazinoate so as to form pyrazinoic acid, and recovering the pyrazinoic acid.

4. A process of decarboxylation of the monopotassium salt of pyrazine-2,3-dicarboxylic acid which comprises heating the monopotassium salt of pyrazine-2,3-dicarboxylic acid in the presence of a polar solvent, precipitating and isolating the crude potassium pyrazinoate so formed, acidifying the potassium pyrazinoate so as to form pyrazinoic acid, and recovering the pyrazinoic acid.

5. A process according to claim 3 in which the pyrazinoic acid is further purified by recrystallization and reprecipitation from water.

6. A process according to claim 3 in which the polar solvent is acidified water.

7. A process according to claim 3 in which the polar solvent is diethylene glycol.

References Cited in the file of this patent

UNITED STATES PATENTS 2,675,384   McEwen _____ Apr. 13, 1954

OTHER REFERENCES

Gabriel et al.: Ber. Deut. Chem. 40, 4855 (1807.)